United States Patent
Huang et al.

(10) Patent No.: US 11,983,640 B2
(45) Date of Patent: May 14, 2024

(54) GENERATING QUESTION TEMPLATES IN A KNOWLEDGE-GRAPH BASED QUESTION AND ANSWER SYSTEM

(71) Applicant: International Business Machines Corporation, Armonk, NY (US)

(72) Inventors: Zi Ming Huang, Beijing (CN); Jian Wang, Beijing (CN); Jing Li, Beijing (CN); Jian Min Jiang, Beijing (CN); Ke Wang, Beijing (CN); Xin Ni, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 16/730,083

(22) Filed: Dec. 30, 2019

(65) Prior Publication Data
US 2021/0201174 A1  Jul. 1, 2021

(51) Int. Cl.
*G06F 16/2458* (2019.01)
*G06F 16/332* (2019.01)
(Continued)

(52) U.S. Cl.
CPC ........... *G06N 5/04* (2013.01); *G06F 16/2458* (2019.01); *G06F 16/3329* (2019.01);
(Continued)

(58) Field of Classification Search
None
See application file for complete search history.

(56) References Cited

U.S. PATENT DOCUMENTS 5,519,608 A * 5/1996 Kupiec ............... G06F 16/3344
 704/9
11,086,911 B2 * 8/2021 Jagan ..................... G06F 40/30
(Continued)

FOREIGN PATENT DOCUMENTS

| CN | 107633060 A | 1/2018 |
| CN | 108038234 A | 5/2018 |
| DE | 112017003946 T5 | 5/2019 |

OTHER PUBLICATIONS

Monk, "Visual Cypher: Presenting Tools that Create, Visualize and Parse Cypher", Aug. 28, 2019 (Year: 2019).*
(Continued)

*Primary Examiner* — Dawaune A Conyers
(74) *Attorney, Agent, or Firm* — Patterson + Sheridan, LLP

(57) ABSTRACT

Techniques for generating a natural language question template for an artificial intelligence question and answer (QA) system are disclosed. A graph database query relating to a QA system is parsed using a predefined schema. The parsing includes extracting a first plurality of values from the graph database query relating to a where clause in the graph database query, extracting a second plurality of values from the graph database query relating to a return clause in the graph database query, identifying a QA template rule relating to the graph database query, based on a match clause in the graph database query. A natural language question template is generated based on the first plurality of values, the second plurality of values, and the identified QA template rule. The natural language question template is suitable for use by the QA system as part of generating a response to a natural language question.

20 Claims, 6 Drawing Sheets

(51) Int. Cl.
*G06F 16/901* (2019.01)
*G06F 40/186* (2020.01)
*G06F 40/205* (2020.01)
*G06N 5/02* (2023.01)
*G06N 5/04* (2023.01)
*G06N 20/00* (2019.01)

(52) U.S. Cl.
CPC ........ *G06F 16/9024* (2019.01); *G06F 40/186* (2020.01); *G06F 40/205* (2020.01); *G06N 5/02* (2013.01); *G06N 20/00* (2019.01)

(56) References Cited

U.S. PATENT DOCUMENTS

| | | | |
|---|---|---|---|
| 2017/0032689 A1* | 2/2017 | Beason | G09B 7/00 |
| 2017/0109355 A1 | 4/2017 | Li et al. | |
| 2017/0199928 A1* | 7/2017 | Zhao | G06F 40/268 |
| 2019/0034410 A1 | 1/2019 | Hudson et al. | |
| 2019/0065576 A1* | 2/2019 | Peng | G06F 16/3329 |
| 2020/0110835 A1* | 4/2020 | Zhao | G06N 5/022 |
| 2021/0201174 A1 | 7/2021 | Huang et al. | |

OTHER PUBLICATIONS

Wu, "Computer-implemented method for dialoguing with user and computer system", Feb. 13, 2018 (Year: 2018).*

Abdalghani Abujabal, Mohamed Yahya, Mirek Riedewald, Gerhard Weikum, "Automated Template Generation for Question Answering Over Knowledge Graphs," 2017 International World Wide Web Conference Committee (IW3C2), published under Creative Commons CC By 4.0 License.WWW 2017, Apr. 3-7, 2017.

Lukas Biermann, Sebastian Walter and Philipp Cimiano, "A Guided Template-Based Question Answering System Over Knowledge Graphs," Knowledge Engineering Team, Semalytix GmbH.

Indurthi et al., "Generating Natural Language Question-Answer Pairs from a Knowledge Graph Using a RNN Based Question Generation Model", Proceedings of the 15th Conference of the European Chapter of the Association for Computational Linguistics: vol. 1, Long Papers, Valencia, Spain, Apr. 3-7, 2017, 10 Pages.

Seyler et al., "Knowledge Questions from Knowledge Graphs", arXiv: 1610.09935v2 [cs.CL], Nov. 1, 2016, 9 Pages.

Sneiders, Eriks, "Automated Question Answering Using Question Templates That Cover the Conceptual Model of the Database", International Conference on Applications of Natural Language to Information Systems, Feb. 28, 2003, 5 Pages.

Zhao et al., "Automatically Generating Questions from Queries for Community-based Question Answering". Proceedings of the 5th International Joint Conference on Natural Language Processing, Chiang Mai, Thailand, Nov. 8-13, 2011, 9 Pages.

Mell et al., "The NIST Definition of Cloud Computing", Recommendations of the National Institute of Standards and Technology, NIST Special Publication 800-145, Sep. 2011, 7 pages.

"List of IBM Patents or Patent Applications Treated As Related," for U.S. Appl. No. 16/730,083, as filed on Dec. 30, 2019.

* cited by examiner

Figure 6:
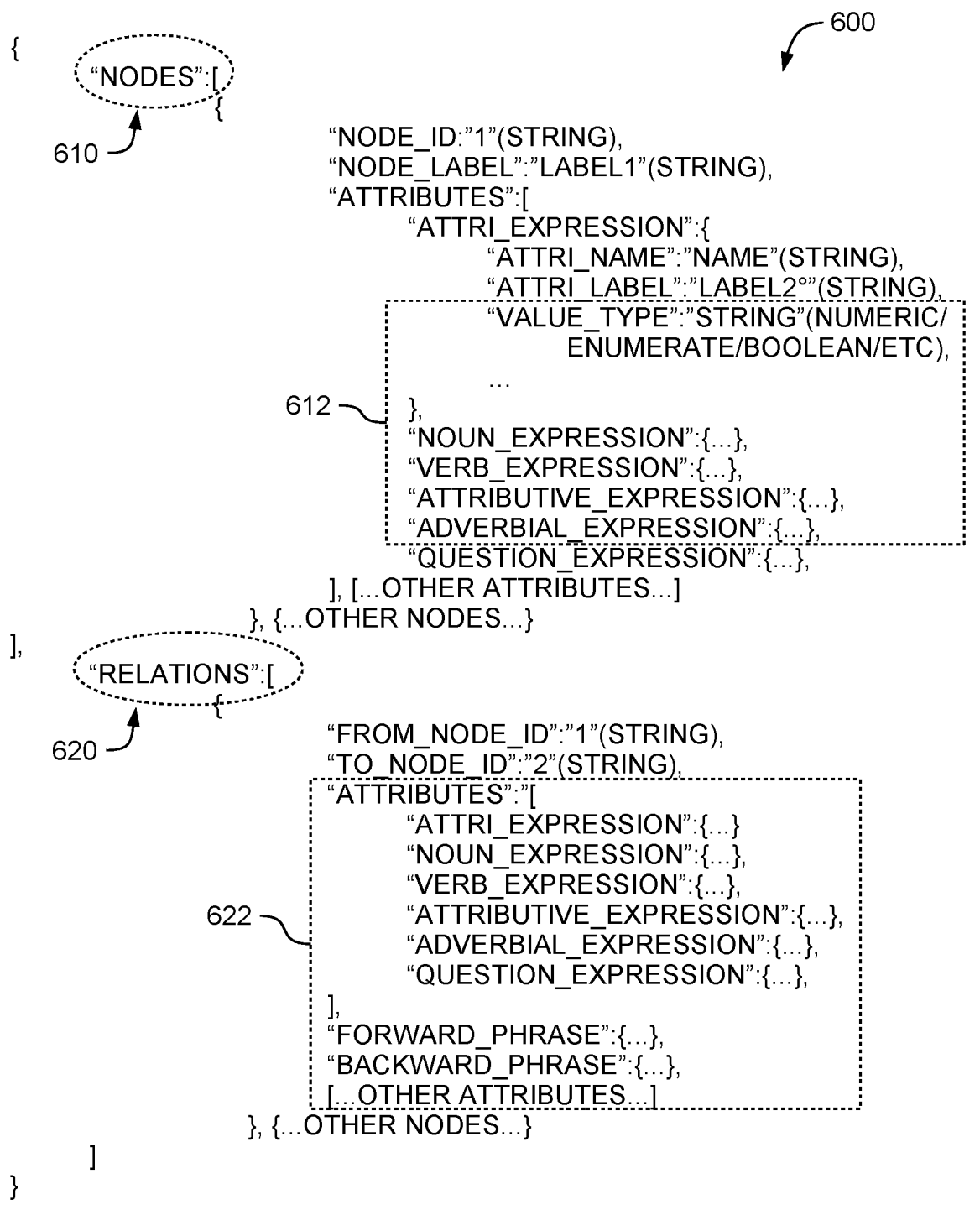

```
{
    "NODES":[      ← 610
        {
            "NODE_ID":"1"(STRING),
            "NODE_LABEL":"LABEL1"(STRING),
            "ATTRIBUTES":[
                "ATTRI_EXPRESSION":{
                    "ATTRI_NAME":"NAME"(STRING),
                    "ATTRI_LABEL":"LABEL2°"(STRING),
                    "VALUE_TYPE":"STRING"(NUMERIC/
                        ENUMERATE/BOOLEAN/ETC),
                    ...
                },                                          ← 612
                "NOUN_EXPRESSION":{...},
                "VERB_EXPRESSION":{...},
                "ATTRIBUTIVE_EXPRESSION":{...},
                "ADVERBIAL_EXPRESSION":{...},
                "QUESTION_EXPRESSION":{...},
            ], [...OTHER ATTRIBUTES...]
        }, {...OTHER NODES...}
    ],
    "RELATIONS":[      ← 620
        {
            "FROM_NODE_ID":"1"(STRING),
            "TO_NODE_ID":"2"(STRING),
            "ATTRIBUTES":"[
                "ATTRI_EXPRESSION":{...}
                "NOUN_EXPRESSION":{...},
                "VERB_EXPRESSION":{...},
                "ATTRIBUTIVE_EXPRESSION":{...},      ← 622
                "ADVERBIAL_EXPRESSION":{...},
                "QUESTION_EXPRESSION":{...},
            ],
            "FORWARD_PHRASE":{...},
            "BACKWARD_PHRASE":{...},
            [...OTHER ATTRIBUTES...]
        }, {...OTHER NODES...}
    ]
}
```

GENERATING QUESTION TEMPLATES IN A KNOWLEDGE-GRAPH BASED QUESTION AND ANSWER SYSTEM

BACKGROUND

The present invention relates to artificial intelligence, and more specifically, to generating question templates in a knowledge-graph based artificial intelligence question and answer (QA) system.

Artificial intelligence based QA systems provide a common form of human-computer interaction. For example, chat-bot systems attract wide research interest and are commonly used by the general public. Many QA systems are constructed using knowledge graphs to represent underlying data. Knowledge graphs are data structures that define large networks of entities and their semantic relationships. They can be a powerful tool for data integration, search, analytics, and context-sensitive recommendations. Knowledge graphs are commonly constructed as a triple: <node1, relation, node2>. For example, a knowledge graph could include a triple defining a person as a member of a band: <person1, memberof, band1>.

Knowledge graph based QA (KGQA) systems can provide improved semantic understanding, by associating knowledge points with edges using semantic information. KGQA systems can also provide improved data accuracy and answer performance, because the knowledge can come from expert annotations or formatting of a database, which results in high data accuracy. Further, KGQA systems can provide improved retrieval efficiency because the structure of a knowledge graph can speed up knowledge indexing.

SUMMARY

Embodiments include a method. The method includes parsing a graph database query relating to an artificial intelligence question and answer (QA) system using a predefined schema. The parsing includes extracting a first plurality of values from the graph database query relating to a where clause in the graph database query, extracting a second plurality of values from the graph database query relating to a return clause in the graph database query, and identifying a QA template rule relating to the graph database query, based on a match clause in the graph database query. The method further includes generating a natural language question template based on the first plurality of values, the second plurality of values, and the identified QA template rule. The natural language question template is suitable for use by the QA system as part of generating a response to a natural language question.

Embodiments further include a system. The system includes a processor and a memory containing a program that, when executed on the processor, performs an operation. The operation includes parsing a graph database query relating to an artificial intelligence question and answer (QA) system using a predefined schema. The parsing includes extracting a first plurality of values from the graph database query relating to a where clause in the graph database query, extracting a second plurality of values from the graph database query relating to a return clause in the graph database query, and identifying a QA template rule relating to the graph database query, based on a match clause in the graph database query. The operation further includes generating a natural language question template based on the first plurality of values, the second plurality of values, and the identified QA template rule. The natural language question template is suitable for use by the QA system as part of generating a response to a natural language question.

Embodiments further include a non-transitory computer program product, including a computer-readable storage medium having computer-readable program code embodied therewith, the computer-readable program code executable by one or more computer processors to perform an operation. The operation includes parsing a graph database query relating to an artificial intelligence question and answer (QA) system using a predefined schema. The parsing includes extracting a first plurality of values from the graph database query relating to a where clause in the graph database query, extracting a second plurality of values from the graph database query relating to a return clause in the graph database query, and identifying a QA template rule relating to the graph database query, based on a match clause in the graph database query. The operation further includes generating a natural language question template based on the first plurality of values, the second plurality of values, and the identified QA template rule. The natural language question template is suitable for use by the QA system as part of generating a response to a natural language question.

BRIEF DESCRIPTION OF THE SEVERAL VIEWS OF THE DRAWINGS

FIG. 6 illustrates a predefined schema for generating question templates in a knowledge-graph based QA system, according to one embodiment.

DETAILED DESCRIPTION

In many current KGQA systems, query types, question types, and question templates are important tools and are not generated automatically. It can take significant labor and time to develop these tools in a real world KGQA system with a large volume of question types. One or more embodiments disclosed herein relate to automatically generating question templates and question types for a KGQA system.

In an embodiment, this requires conversion of database query statements (e.g., graph query statements) into natural language question templates. Cypher, a graph query language, is one example of a suitable query language. Cypher is merely one example, and other suitable database query languages (e.g., graph query languages or relational database query languages like SQL) can be used. Converting queries into natural language question templates can be done using a predefined schema definition structure to define the translation rules for nodes, relations, constants, and functions.

A query parser can use the schema to parse the query language (e.g., Cypher) to identify the question translation rules. In an embodiment, the query parser can include a where clause parser to map conditional statements in the query language, a return clause processor to confirm the queried nodes and convert return functions, and a match clause parser to identify the rules for formatting the output. In an embodiment, these processors can be used to recursively parse each clause in the query statement. Finally, a generator can be used to translate the parsed cypher to a natural language template. Together, this can be used to parse the input query (e.g., Cypher) and output natural language question templates and question types. This can be used to generate natural language question templates quickly and efficiently, without requiring manual creation. Further, the natural language question templates allow the QA system to quickly, and accurately, identify a type of a natural language question (e.g., by comparing the question with a corresponding template).

Figure 1:
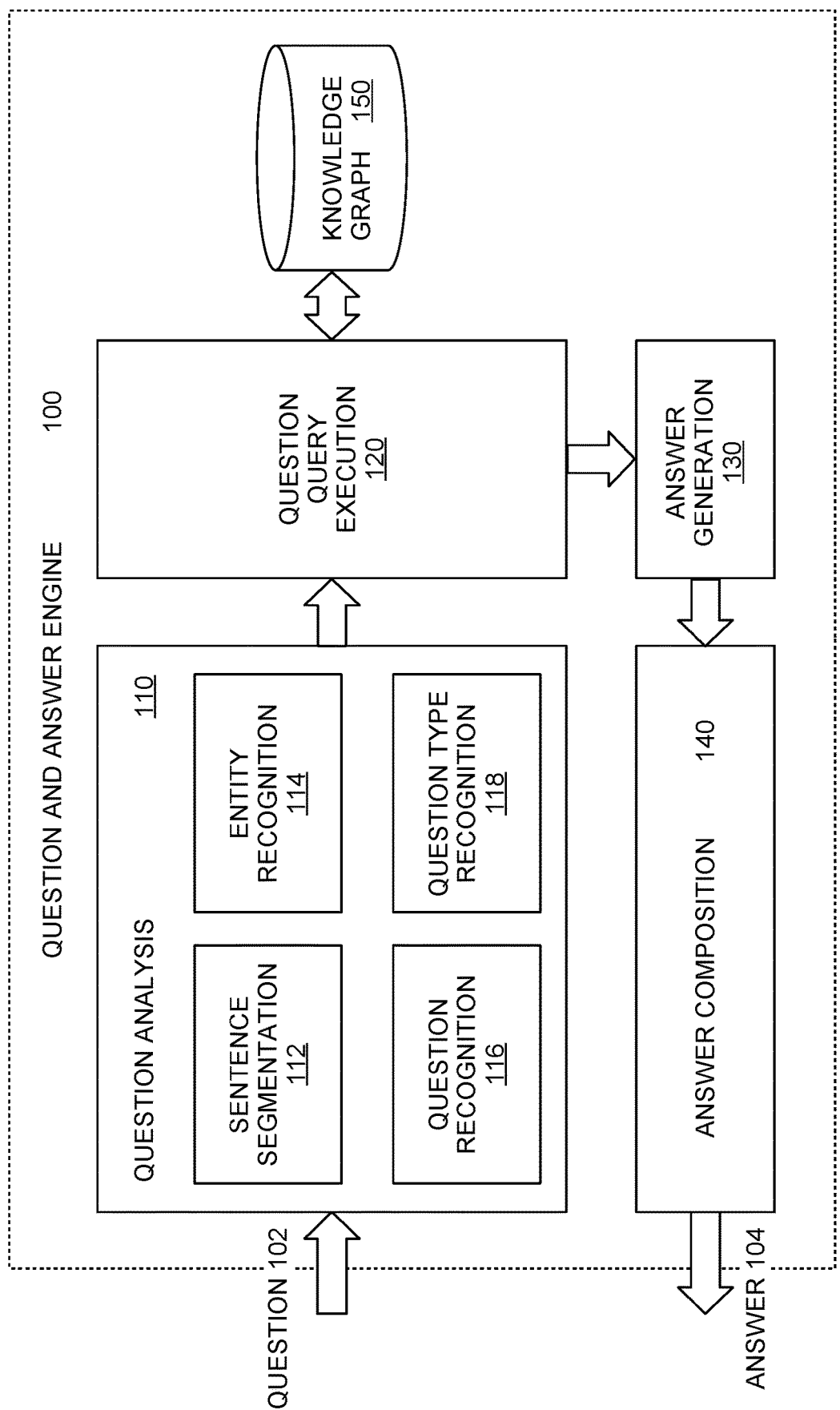
FIG. 1 illustrates a knowledge-graph based QA system, according to one embodiment.

FIG. 1 illustrates a knowledge-graph based QA system, according to one embodiment. A question and answer engine 100 receives a question 102. This question 102 is framed in natural language (e.g., a question from a person). The question and answer engine 100 generates an answer 104. The answer 104 is also in natural language.

The question and answer engine 100 includes a question analysis module 110. In an embodiment, the question analysis module 110 parses and analyzes the question. The question analysis module 110 includes a sentence segmentation module 112, an entity recognition module 114, a question recognition module 116, and a question type recognition module 118. The question analysis module 110 feeds its output to a question query execution engine 120. The question query execution engine 120 uses a knowledge graph 150 to execute a query corresponding to the question 102 (e.g., in order to answer the question).

The question query execution engine 120 provides the results of the executed query to an answer generation engine 130. The answer generation engine 130 forms an initial answer to the question, using the results of the query from question query execution engine 120. The answer generation engine 130 feeds its output to an answer composition module 140. The answer composition module 140 completes the answer and provides it as the answer 104.

In an embodiment, as discussed above, the question and answer engine 100 uses question templates to determine question types and to label questions. In prior systems, this labeling is done manually, and is very time consuming and labor intensive. Instead, as discussed further with regard to FIGS. 2-6 below, question templates can be generated automatically from graph database queries (e.g., Cypher queries). These question templates can then be used by a QA system (e.g., using a question and answer engine 100) to generate natural language answers in response to natural language questions.

Figure 2:
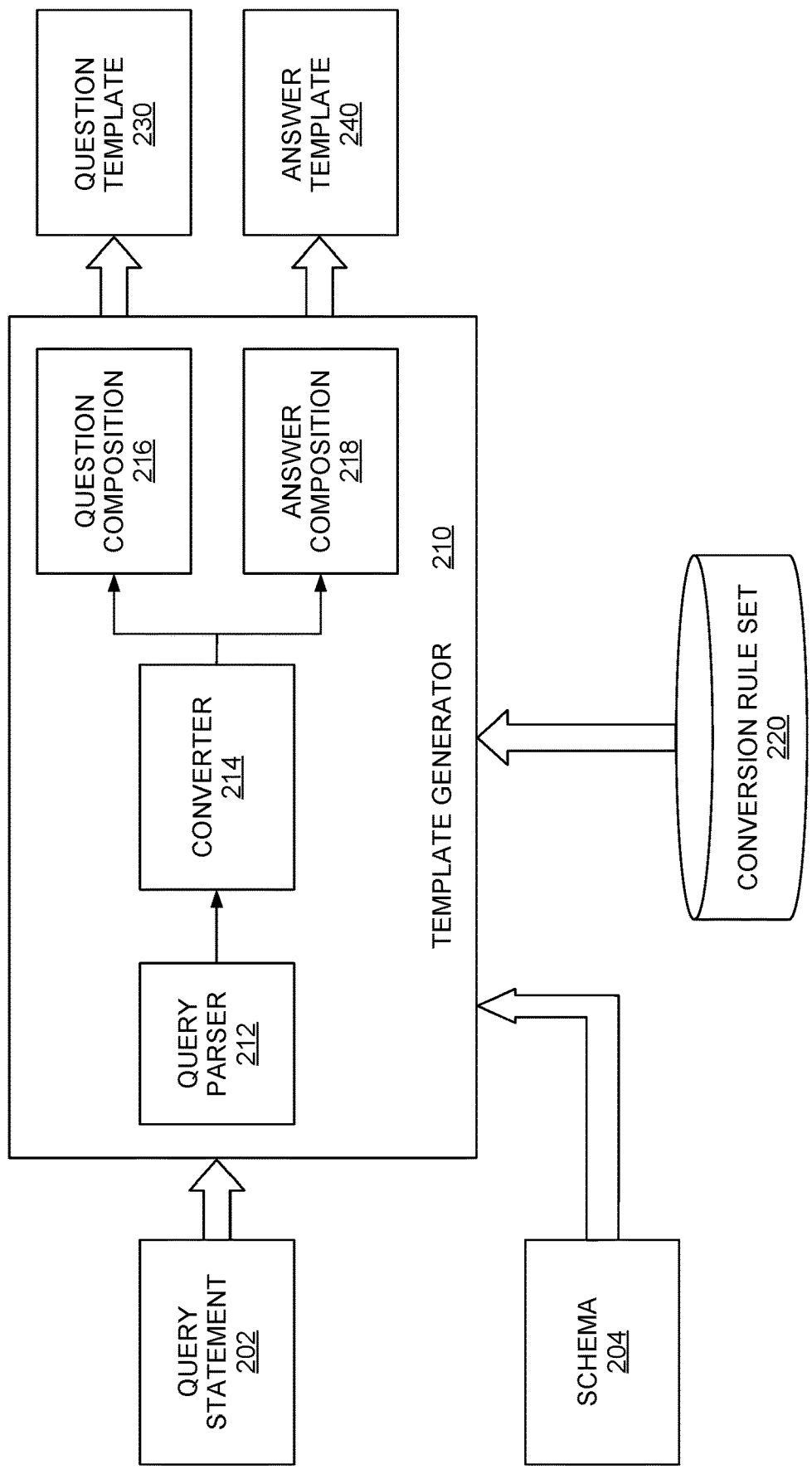
FIG. 2 illustrates generating question templates in a knowledge-graph based QA system, according to one embodiment.

FIG. 2 illustrates generating question in for a knowledge-graph based QA system, according to one embodiment. A template generator 210 receives a query statement 202. In an embodiment, this is a database query statement. For example, the query statement 202 can be a Cypher query. As discussed above, Cypher is merely one example and other query languages can be used. In an embodiment, the query statement 202 is generated by a knowledge graph component of a KGQA system. The template generator 210 further receives a schema 204. In an embodiment, this is a predefined schema used to automatically generate question templates. This predefined schema is discussed further with regard to FIG. 6, below.

The template generator includes a query parser 212, a converter 214, a question composition module 216, and an answer composition module 218. In an embodiment, the query parser 212 parses the query statement 202 (e.g., a Cypher query) into its component parts. For example, FIG. 3, below, illustrates a query parser 312 that uses a where clause processor 322, a return clause processor 324, and a match clause processor 326 to parse a query. In an embodiment, the query parser 212 further uses the schema 204 to parse the query statement 202.

The query parser 212 outputs a parsed query to a converter 214. In an embodiment, the converter 214 uses a conversion rule set 220 to convert the parsed query and provides output to the question composition module 216 and the answer composition module 218. In an embodiment, the question composition module 216 forms a natural language question template corresponding with the query statement 202 and the answer composition module forms answer templates corresponding with the query statement 202. In an embodiment, the template generator 210 outputs a question template 230 and an answer template 240.

For example, assume the query statement 202 is a Cypher query relating to matching a pharmaceutical medication with its manufacturer: "MATCH (d:medication)→(m:manufacturer) WHERE d.name='aspirin' RETURN d.name as dn, m.name". The schema 204 is a predefined schema that defines properties for nodes in the knowledge graph (e.g., a property "name" for a node "medication") and defines relations between nodes. The template generator 210 generates a question template 230: "Which company manufactures the medication which name is aspirin." The template generator 210 further generates three answer templates 240. A first answer template 240 corresponds with zero results to the question, and states: "No companies found." A second answer template 240 corresponds with one result to the question, and states: "{dn} is produced by {m.name}". A third answer template 240 corresponds with more than one result, and states: {N} companies manufacture {dn}, they are: {m.name1}, {m.name2}, m.name3}". These question and answer templates can then be used to answer natural language questions.

Figure 3:
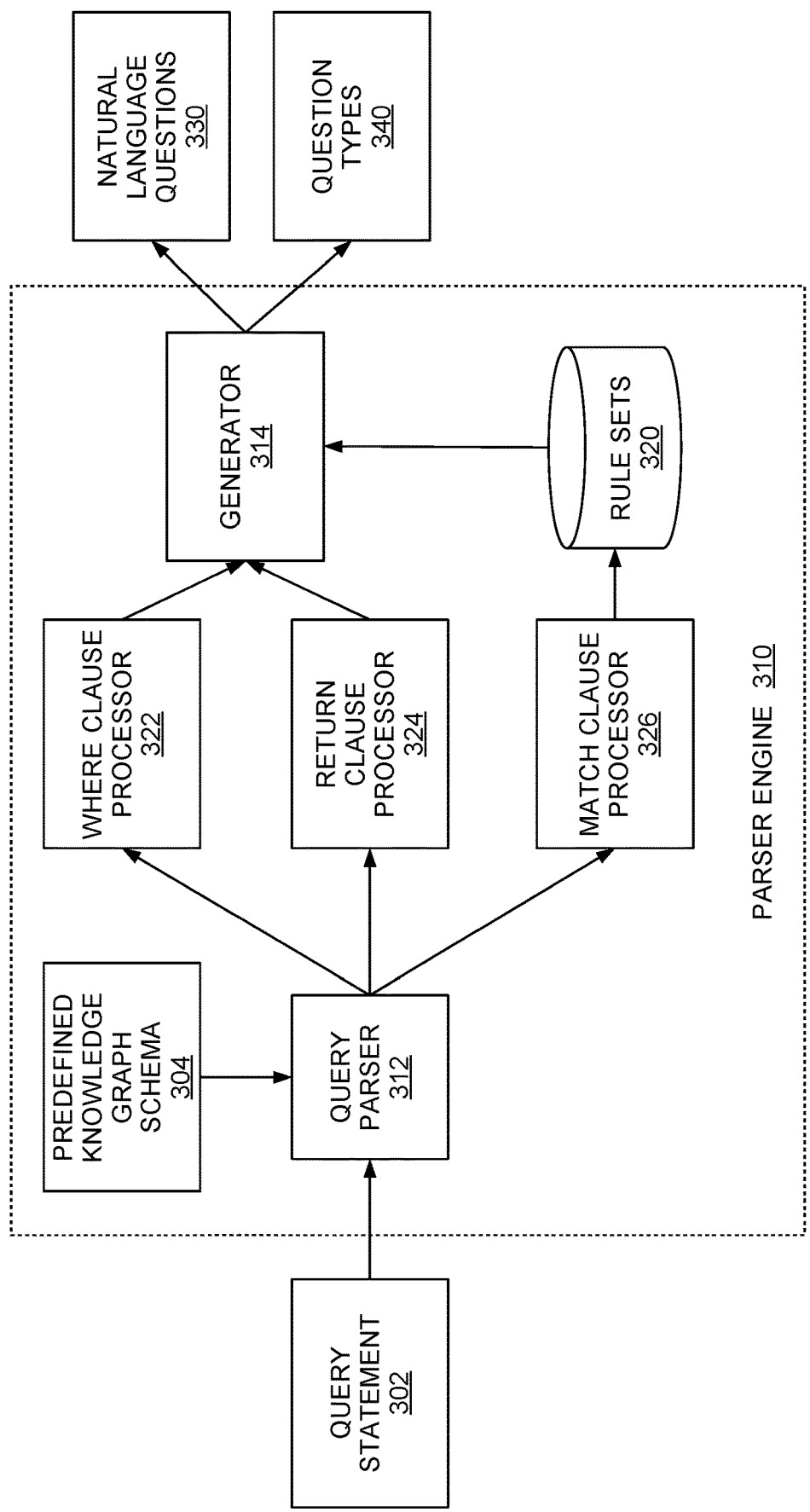
FIG. 3 further illustrates generating question templates in a knowledge-graph based QA system, according to one embodiment.

FIG. 3 further illustrates generating question templates in a knowledge-graph based QA system, according to one embodiment. A parser engine 310 includes a predefined knowledge graph schema 304, a query parser 312, a where clause processor 322, a return clause processor 324, a match clause processor, a generator 314, and rulesets 320. The query parser 312 receives a query statement 302. Like the query statement 202 illustrated in FIG. 2, in an embodiment this is a database query statement. For example, the query statement 302 can be a Cypher query. Cypher is merely one example and other query languages can be used.

In an embodiment, the query parser 312 uses the predefined knowledge graph schema 304 to parse the query statement 302. As discussed further with regard to FIG. 6, below, in an embodiment the predefined knowledge graph schema 304 defines a structure for nodes and relations in a knowledge graph. For example, the predefined knowledge graph schema 304 can include question type as a property for nodes in the knowledge graph, and can match forward and backward phrases to different templates for different node queries.

The query parser 312 feeds its output to the where clause processor 322, the return clause processor 324, and the match clause processor 326. In an embodiment, each of these processors 322, 324, and 326 processes a portion of the parsed query. The where clause processor 322 extracts from the parsed query the nodes, the operation, the function, and a condition. The extracted node includes the entities included in the where clause, and corresponding attributes. The extracted operation includes the operation of the where clause, translated to a natural language form. In an embodiment, the extracted operation can be a string, a numeric value, an enumerate value, a boolean, or any other suitable data type. The extracted function (e.g., avg, min, max, etc.) is translated from the parsed query. In an embodiment, the where clause processor 322 uses the predefined knowledge graph schema 304 for the operation translation, the function translation, or both. The extracted condition (e.g., NOT, AND, OR, etc.) is translated from the query based priority relations.

In an embodiment, the return clause processor 324 extracts from the parsed query the node, the return context, and the return function. The extracted node can include the entity and corresponding attributes. The extracted return context can be based on relations between nodes, and can include the actual return context of the parsed query. The extracted return function can include a combination of return functions, translated from the parse query. In an embodiment, the match clause processor 326 combines relationships between nodes and matches the parsed query to a question template rule (e.g., from the rulesets 320).

The generator 314 receives the output from the where clause processor 322 and the return clause processor 324, along with a question template rule from the rulesets 320. As discussed above, this includes the extracted nodes, operation, function, and condition from the where clause processor 322, the node, the return context, and the return function from the return clause processor 324, and the rule identified by the match clause processor 326. The generator 314 uses these inputs to generate natural language question templates, and outputs natural language questions 330 and question types 340. The generator 314 is discussed in more detail with regard to FIG. 5, below.

Figure 4:
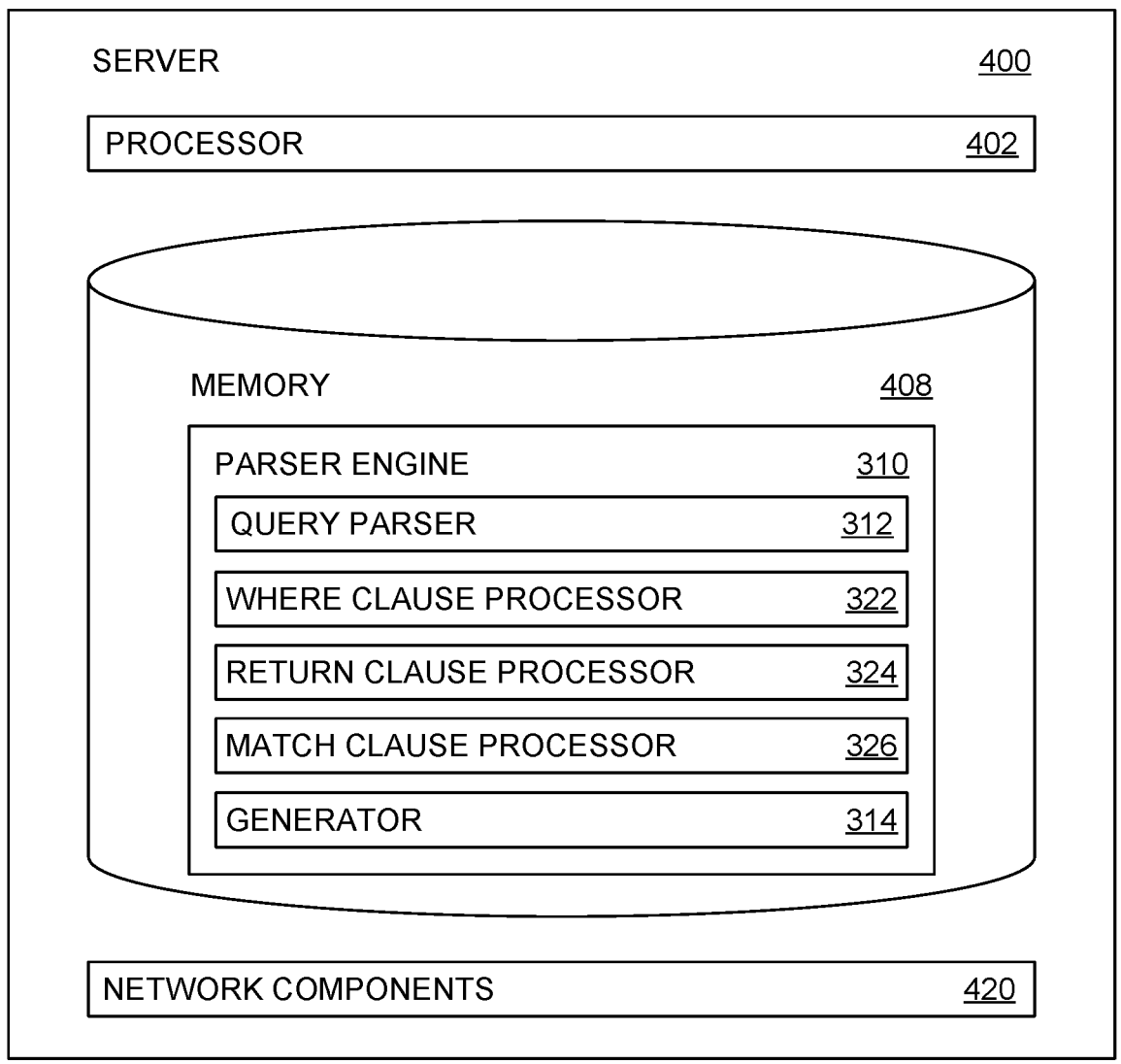
FIG. 4 illustrates a server for generating question templates in a knowledge-graph based QA system, according to one embodiment.

FIG. 4 illustrates a server for generating question templates in a knowledge-graph based QA system, according to one embodiment. The server 400 includes a processor 402, a memory 408, and network components 420. The processor 402 generally retrieves and executes programming instructions stored in the memory 408. The processor 402 is included to be representative of a single central processing unit (CPU), multiple CPUs, a single CPU having multiple processing cores, graphics processing units (GPUs) having multiple execution paths, and the like. Further, the server 400 can be a single server computer, or can represent a collection of server computers (e.g., a distributed system).

The network components 420 include the components necessary for the server 400 to interface with a wireless or wired communication network (e.g., a cellular network, a wide area network, a local area network, etc.). For example, the network components 420 can include WiFi or cellular network interface components and associated software, or wired network interface components (e.g., Ethernet components, fiber optic components, etc.).

Although the memory 408 is shown as a single entity, the memory 408 may include one or more memory devices having blocks of memory associated with physical addresses, such as random access memory (RAM), read only memory (ROM), flash memory, or other types of volatile and/or non-volatile memory. The memory 408 generally includes program code for performing various functions related to use of the server 400. The program code is generally described as various functional "applications" or "modules" within the memory 408, although alternate implementations may have different functions and/or combinations of functions.

Within the memory 408, the parser engine 310 manages generating question templates in a knowledge-graph based QA system. This is discussed in further detail with regard to FIG. 3, above. For example, the query parser 312 parses a query statement (e.g., a Cypher query). The where clause processor 322 processes the parsed query and extracts from the parsed query various aspects related to a where clause in the query. The return clause processor 324 processes the parsed query and extracts various aspects related to a return clause in the query. The match clause processor 326 matches the parsed query with relevant question template generation rules. The generator 314 uses the output of the where clause processor 322, the return clause processor 324, and the match clause processor 326 to generate natural language question templates for the QA system. These are discussed above in relation to FIG. 3 and further below in relation to the subsequent figures.

Figure 5:
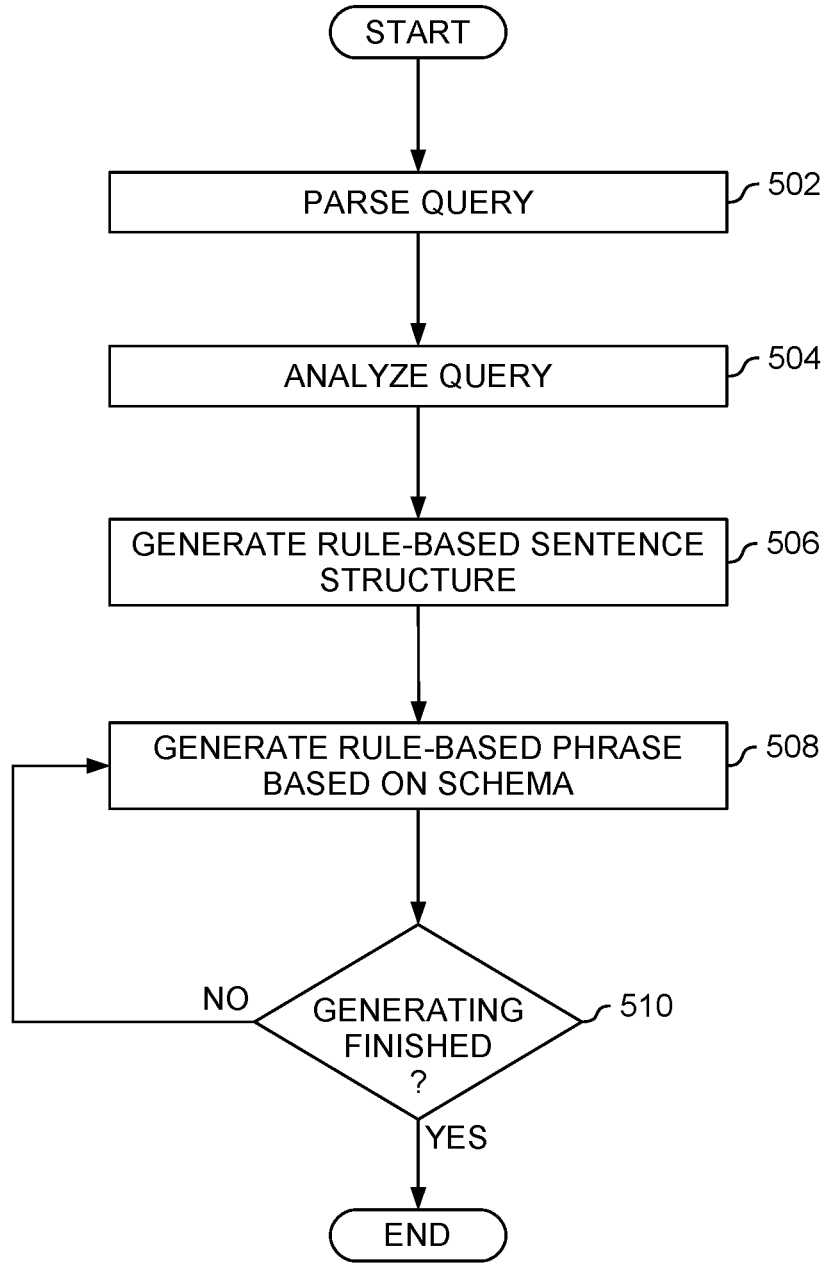
FIG. 5 is a flowchart for generating question templates in a knowledge-graph based QA system, according to one embodiment.

FIG. 5 is a flowchart for generating question templates in a knowledge-graph based QA system, according to one embodiment. At block 502, a query parser (e.g., the query parser 312 illustrated in FIGS. 3-4) parses a query statement (e.g., a Cypher query) into its component parts. In an embodiment, a known parser (e.g., a Cypher parser) can be used.

At block 504, a parser engine (e.g., the parser engine 310 illustrated in FIGS. 3-4) analyzes the query. In an embodiment, the parser engine annotates the parsed query and extracts the nodes, attributes, operations, etc. For example, this can be done using the where clause processor 322, the return clause processor 324, and the match clause processor 326, all illustrated in FIGS. 3-4. Further, these parser engine can use a predefined knowledge graph schema (e.g., the predefined knowledge graph schema 304 illustrated in FIG. 3) to analyze the query using the various processors 322, 324, and 326. As one example, the parser engine can analyze a Cypher query and generate annotated values:
{
    nodeset:{N1, N2, . . . , Na}
    relationset:{R1, R2, . . . , Rb}
    attributeset: {(N1.attr1, . . . , N1.attrx), . . . , (R1.attr1, . . . , R1.attry), . . . }
    conditionset: {cond1, . . . , condc}
}

At block 506, the parser engine (e.g., the generator 314 illustrated in FIGS. 3-4) generates a rule-based sentence structure corresponding with the query. In an embodiment, the parser engine generates a higher level natural language structure defining how the eventual natural language question template should be phrased.

At block 508, the parser engine (e.g., the generator 314) generates a rule-based phrase based on a schema. In an embodiment, the parser engine uses a predefined schema (e.g., the predefined knowledge graph schema 304 illustrated in FIG. 3), and the higher level natural language structure defined at block 506, to generate the template natural language phrase.

At block 510, the parser engine determines whether the generating is finished. If the generating is finished, the flow ends. If the generating is not finished, the flow returns to block 508.

FIG. 6 illustrates a predefined schema 600 for generating question templates in a knowledge-graph based QA system, according to one embodiment. In an embodiment, this corresponds with the predefined knowledge graph schema 304 illustrated in FIG. 3. The schema 600 includes a "nodes" portion 610 and a "relations" portion 620.

The nodes portion 610 includes an identifier, a label, and attributes corresponding with each node. Further, the nodes portion 610 includes question type attributes 612. In an embodiment, these correspond with different question types and are used to generate question templates from a query statement.

The relations portion 620 includes a portion 622 with a number of attributes, including a forward phrase attribute and a backward phrase attribute. In an embodiment, the forward and backward phrase attributes define the question templates (e.g., the automatically generated question templates) to use when different nodes are queried. This facilitates generating question templates from a query statement.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the parser engine 310 illustrated in FIGS. 3-4) or related data available in the cloud. For example, the parser engine could execute on a computing system in the cloud and question templates in a knowledge-graph based QA system. In such a case, the parser engine could parse and analyze a query and store question templates at a storage location in the cloud. [Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   parsing a graph database query relating to an automated artificial intelligence question and answer (QA) system using a predefined schema, using a parser engine, the parsing comprising:
      processing a where clause in the graph database query to generate a where clause processor output, comprising:
         extracting a first plurality of values, comprising a node, an operation, a function, and a condition, from the graph database query;
      processing a return clause in the graph database query to generate a return clause processor output, comprising:
         extracting a second plurality of values, comprising a return context and a return function, from the graph database query; and
      identifying a QA template rule relating to the graph database query, based on a match clause in the graph database query, comprising:
         selecting the QA template rule from a collection of QA template rules based on the match clause; and
   generating a natural language question template based on the where clause processor output, the return clause processor output, and the identified QA template rule, using a template generator; and
   providing the natural language question template to the automated QA system so that the QA system can generate a response to a natural language question using the natural language question template.

2. The method of claim 1, wherein the graph database query comprises a Cypher query.

3. The method of claim 1, wherein the generated natural language question template identifies a type of natural language question.

4. The method of claim 1, wherein the first plurality of values comprises the node relating to the where clause and a first one or more attributes relating to the node.

5. The method of claim 4, wherein the second plurality of values comprises a second node relating to the return clause and a second one or more attributes relating to the second node.

6. The method of claim 4, wherein the first plurality of values further comprises the operation relating to the where clause.

7. The method of claim 6, wherein the first plurality of values further comprises at least one of a function relating to the where clause or a condition relating to the where clause.

8. The method of claim 1, wherein the predefined schema comprises a predefined knowledge graph schema, and wherein the predefine schema comprises:

a first portion relating to one or more nodes and comprising one or more attributes relating to question type; and a second portion relating to one or more relations between nodes and comprising a forward phrase attribute relating to a first question template and a backward phrase attribute relating to a second question template.

9. The method of claim 1, wherein identifying the QA template rule relating to the graph database query comprises retrieving the QA template rule from a storage location.

10. The method of claim 1, wherein generating the natural language question template based on the where clause processor output, the return clause processor output, and the identified QA template rule using the template generator further comprises:

generating a phrase for the natural language question template based on a sentence structure by using the predefined schema to identify at least one of: (i) a forward phrase relating to a first question template, or (ii) a backward phrase relating to a second question template.

11. A system, comprising:

a processor; and a memory containing a program that, when executed on the processor, performs an operation, the operation comprising:

parsing a graph database query relating to an automated artificial intelligence question and answer (QA) system using a predefined schema, using a parser engine, the parsing comprising:

processing a where clause in the graph database query to generate a where clause processor output, comprising:

extracting a first plurality of values, comprising a node, an operation, a function, and a condition from the graph database query;

processing a return clause in the graph database query to generate a return clause processor output, comprising:

extracting a second plurality of values, comprising a return context and a return function, from the graph database query; and identifying a QA template rule relating to the graph database query, based on a match clause in the graph database query, comprising:

selecting the QA template rule from a collection of QA template rules based on the match clause; and generating a natural language question template based on the where clause processor output, the return clause processor output, and the identified QA template rule, using a template generator; and providing the natural language question template to the automated QA system so that the QA system can generate a response to a natural language question using the natural language question template.

12. The system of claim 11, wherein the graph database query comprises a Cypher query and wherein the generated natural language question template identifies a type of natural language question.

13. The system of claim 11, wherein the first plurality of values comprises the node relating to the where clause and a first one or more attributes relating to the node and wherein the second plurality of values comprises a second node relating to the return clause and a second one or more attributes relating to the second node.

14. The system of claim 11, wherein the predefined schema comprises a predefined knowledge graph schema, and wherein the predefine schema comprises:

a first portion relating to one or more nodes and comprising one or more attributes relating to question type; and a second portion relating to one or more relations between nodes and comprising a forward phrase attribute relating to a first question template and a backward phrase attribute relating to a second question template.

15. The system of claim 11, wherein generating the natural language question template based on the where clause processor output, the return clause processor output, and the identified QA template rule using the template generator further comprises:

generating a phrase for the natural language question template based on a sentence structure by using the predefined schema to identify at least one of: (i) a forward phrase relating to a first question template, or (ii) a backward phrase relating to a second question template.

16. A non-transitory computer program product comprising:

a computer-readable storage medium having computer-readable program code embodied therewith, the computer-readable program code executable by one or more computer processors to perform an operation, the operation comprising:

parsing a graph database query relating to an automated artificial intelligence question and answer (QA) system using a predefined schema, using a parser engine, the parsing comprising:

processing a where clause in the graph database query to generate a where clause processor output, comprising:

extracting a first plurality of values, comprising a node, an operation, a function, and a condition, from the graph database query;

processing a return clause in the graph database query to generate a return clause processor output, comprising:

extracting a second plurality of values, comprising a return context and a return function, from the graph database query; and identifying a QA template rule relating to the graph database query, based on a match clause in the graph database query, comprising:

selecting the QA template rule from a collection of QA template rules based on the match clause; and generating a natural language question template based on the where clause processor output, the return clause processor output, and the identified QA template rule, using a template generator; and providing the natural language question template to the automated QA system so that the QA system can generate a response to a natural language question using the natural language question template.

17. The computer program product of claim 16, wherein the graph database query comprises a Cypher query and wherein the generated natural language question template identifies a type of natural language question.

18. The computer program product of claim 16, wherein the first plurality of values comprises the node relating to the where clause and a first one or more attributes relating to the node and wherein the second plurality of values comprises a second node relating to the return clause and a second one or more attributes relating to the second node.

19. The computer program product of claim 16, wherein the predefined schema comprises a predefined knowledge graph schema, and wherein the predefine schema comprises:
- a first portion relating to one or more nodes and comprising one or more attributes relating to question type; and
- a second portion relating to one or more relations between nodes and comprising a forward phrase attribute relating to a first question template and a backward phrase attribute relating to a second question template.

20. The non-transitory computer program product of claim 16, wherein generating the natural language question template based on the where clause processor output, the return clause processor output, and the identified QA template rule using the template generator further comprises:
- generating a phrase for the natural language question template based on a sentence structure by using the predefined schema to identify at least one of: (i) a forward phrase relating to a first question template, or (ii) a backward phrase relating to a second question template.

* * * * *